(12) United States Patent
Zhang et al.

(10) Patent No.: US 11,785,647 B2
(45) Date of Patent: *Oct. 10, 2023

(54) METHOD AND APPARATUS FOR INFORMATION TRANSMISSION

(71) Applicant: ZTE CORPORATION, Guangdong (CN)

(72) Inventors: Wen Zhang, Guangdong (CN); Bo Dai, Guangdong (CN); Shuqiang Xia, Guangdong (CN); Huiying Fang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,853

(22) Filed: May 27, 2022

(65) Prior Publication Data

US 2022/0287106 A1 Sep. 8, 2022

Related U.S. Application Data

(63) Continuation of application No. 16/074,065, filed as application No. PCT/CN2017/072962 on Feb. 6, 2017, now Pat. No. 11,375,545.

(30) Foreign Application Priority Data

Feb. 5, 2016 (CN) .......................... 201610082888.7
Feb. 17, 2016 (CN) .......................... 201610089499.7

(51) Int. Cl.
*H04W 72/20* (2023.01)
*H04L 5/00* (2006.01)
(Continued)

(52) U.S. Cl.
CPC ....... *H04W 74/0833* (2013.01); *H04L 5/0048* (2013.01); *H04W 4/80* (2018.02);
(Continued)

(58) Field of Classification Search
None
See application file for complete search history.

(56) References Cited

U.S. PATENT DOCUMENTS

| 9,553,701 B2 * | 1/2017 | Sadeghi | ................. H04L 5/005 |
| 2014/0098761 A1 * | 4/2014 | Lee | ...................... H04W 72/21 |
| | | | 370/329 |

(Continued)

FOREIGN PATENT DOCUMENTS

WO    WO-2017022902 A1 *    2/2017    ............ H04W 24/10

OTHER PUBLICATIONS

International Search Report dated Mar. 30, 2017, in corresponding International Application No. PCT/CN2017/072962.
(Continued)

*Primary Examiner* — Ajit Patel
(74) *Attorney, Agent, or Firm* — Duane Morris LLP

(57) ABSTRACT

The present disclosure provides a method and an apparatus for information transmission. The method can include: receiving a message from a wireless communication node, the message comprising information of a frequency position of an anchor carrier that is configured to carry a synchronization signal, an indication of an operation mode assigned to the wireless communication device and an indicator of same-Physical Cell Identity (PCI); and determining, based on the message, the operation mode and the frequency position of the anchor carrier, wherein the frequency position of the anchor carrier, the operation mode and the indicator of same-PCI are jointly coded and indicated.

9 Claims, 1 Drawing Sheet

Determine available narrow bands based on information including at least one of: a system bandwidth, a cell identity, a position of an anchor carrier, information indicated by a PSS, information indicated by an SSS, information indicated by a MIB and information indicated by a SIB, and the information or channel transmitted over the one or more narrow bands includes at least one of: a downlink control channel, a PDSCH, an RAR, a paging message, a SIB, a MIB, a PRACH, a PUSCH, and a PUCCH. — S102

Transmit information or channel over one or more of available narrow bands, including available uplink narrow bands and/or available downlink narrow bands. — S104

(51) Int. Cl.
*H04W 74/08* (2009.01)
*H04W 4/80* (2018.01)
*H04W 56/00* (2009.01)
*H04W 68/02* (2009.01)
*H04W 48/12* (2009.01)
*H04W 72/23* (2023.01)

(52) U.S. Cl.
CPC ......... *H04W 56/001* (2013.01); *H04W 68/02* (2013.01); *H04W 72/20* (2023.01); *H04L 5/0012* (2013.01); *H04W 48/12* (2013.01); *H04W 72/23* (2023.01)

(56) References Cited

U.S. PATENT DOCUMENTS

| | | |
|---|---|---|
| 2016/0205692 A1 | 7/2016 | Zhang |
| 2016/0249307 A1* | 8/2016 | Thangarasa ......... H04W 56/001 |
| 2017/0194988 A1 | 7/2017 | Li |
| 2017/0208592 A1 | 7/2017 | Rico Alvarino et al. |
| 2018/0212726 A1 | 7/2018 | Xue et al. |
| 2018/0241495 A1 | 8/2018 | Xue et al. |
| 2018/0270008 A1 | 9/2018 | Yi et al. |
| 2018/0287845 A1 | 10/2018 | Kim et al. |

OTHER PUBLICATIONS

Alcatel-Lucent, Alcatel-Lucent Shanghai Bell, "Considerations of Multi-Band NB-IoT", 3GPP TSG RAN WG1 NB-IoT ad-hoc, TSR1-160180, Jan. 20, 2016, Section 2, 3 pages.

Official Action dated Sep. 6, 2019 in corresponding Chinese Patent Application No. 2016100894997.

Qualcomm Incorporated, "NB-PBCH Design", 3GPP TSG RAN WG1 NB-IoT Ad-Hoc Meeting, R1-160102, Jan. 18-20, 2016, Budapest, Hungary, pp. 1-10.

Samsung, "NB-MIB Design", 3GPP TSG-RAN WG1 Meeting #84, R1-160549, St. Julian's, Malta, Feb. 15-19, 2016, 4 pages.

* cited by examiner

METHOD AND APPARATUS FOR INFORMATION TRANSMISSION

TECHNICAL FIELD

The present disclosure relates to communication technology, and more particularly, to a method and an apparatus for information transmission.

BACKGROUND

Machine Type Communication (MTC) User Equipment (UE), also referred to as Machine to Machine (M2M) user communication device, is currently a main form of application of Internet of Things (IoT). In the 3rd Generation Partnership Project (3GPP) Technical Report (TR) 45.820 V200, several techniques suitable for Cellular IoT (C-IoT) are disclosed, among which Narrow-Band Internet of Things (NB-IoT) is the most attractive one. The bandwidth of the system is 200 KHz, which is the same as the channel bandwidth of Global System for Mobile communication (GSM) system. This is advantageous for the NB-IoT system to reuse the spectra of the GSM system and reduce interference with neighboring GSM channels. The transmission bandwidth is 180 KHz, which is the size of one Physical Resource Block (PRB) in the Long Term Evolution (LTE) system and can be transmitted over one PRB in the LTE system bandwidth. NB-IoT has three operation scenarios: standalone mode, guard band mode and in-band mode.

In the related art, there is currently no effective solution to the problem regarding how to obtain multiple narrow bands/carriers in NB-IoT.

SUMMARY

The embodiments of the present disclosure provide a method and an apparatus for information transmission, capable of solving at least the problem regarding how to obtain multiple narrow bands/carriers in NB-IoT in the related art.

According to an embodiment of the present disclosure, a method for information transmission is provided. The method includes: transmitting information or a channel over one or more of available narrow bands. The available narrow bands include available uplink narrow bands and/or available downlink narrow bands and the available narrow bands are determined based on information including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB). The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH).

Further, in addition to being used in determining the available narrow bands, the position of the anchor carrier is used to indicate at least one of: scheduling information for the SIB, the number of bits or a field included in the MIB, a time-domain frequency hopping granularity, a frequency-domain frequency hopping interval, a frequency hopping pattern, and a frequency-domain position at which the information or channel is transmitted.

Further, the number of available narrow bands is one of: a multiple of 2, a multiple of 3, a power of 2, a multiple of G, and an element from a set {2, 4, 8, 12 and 16}, where G is the number of Physical Resource Blocks (PRBs) included in a Resource Block Group (RBG) corresponding to the system bandwidth and G is a positive integer.

Further, the number of available narrow bands is determined based on the system bandwidth.

Further, the available narrow bands are at one of the following positions in within a transmission bandwidth: two ends of the transmission bandwidth, one end of the transmission bandwidth, two sides of six or seven PRBs at the center of the transmission bandwidth, one side of six or seven PRBs at the center of the transmission bandwidth, the center of the transmission bandwidth, and predetermined frequency-domain intervals over the transmission bandwidth.

Further, PRBs or RBGs at two ends of the transmission bandwidth, one end of the transmission bandwidth, two sides of six or seven PRBs at the center of the transmission bandwidth, one side of six or seven PRBs at the center of the transmission bandwidth, or the center of the transmission bandwidth are one of: N consecutive PRBs or regularly spaced PRBs, N consecutive RBGs or regularly spaced RBGs, and N PRBs from N RBGs each including one PRB as an available narrow band, where N is a positive integer.

Further, the available narrow bands include one of: N narrow bands within a transmission bandwidth corresponding to the system bandwidth, N narrow bands within a guard band or guard bands at one or both ends of the system bandwidth, N1 narrow bands within the transmission bandwidth corresponding to the system bandwidth and N2 narrow bands within the guard band(s) at one or both ends of the system bandwidth, and N narrow bands within all or part of guard bands of two adjacent system bandwidths in frequency domain, where N, N1 and N2 are positive integers.

Further, during a random access procedure or before establishment of a Radio Resource Control (RRC) connection, or before configuration of a narrow band for a User Equipment (UE), the operation of transmitting the information or channel over the one or more of the available narrow bands includes one of: transmitting the PRACH or PUSCH over an uplink anchor carrier that is predetermined or configured by an evolved NodeB (eNB), and transmitting the downlink control channel or PDSCH over a downlink anchor carrier or a downlink narrow band corresponding to the uplink anchor carrier; transmitting the PRACH or PUSCH over an uplink narrow band selected from a set of narrow bands based on a coverage level, and transmitting the downlink control channel or PDSCH over a downlink narrow band corresponding to the uplink narrow band or an anchor carrier, the set of narrow bands being predetermined or configured by the eNB; and transmitting the PRACH or PUSCH over a narrow band selected from a set of narrow bands, and transmitting the downlink control channel or PDSCH over a downlink narrow band corresponding to the uplink narrow band or an anchor carrier, the set of narrow bands being predetermined or configured by the eNB.

Further, the available narrow bands for transmitting the paging message include one of: a downlink anchor carrier, a downlink narrow band corresponding to a PRACH narrow band at the highest coverage level, and a downlink narrow band determined from a set of paging narrow bands based on a UE identity, the set of paging narrow bands being predetermined or configured via the SIB.

Further, a subframe for transmitting the paging message is determined based on a type of the narrow band for transmitting the paging message.

Further, a position of the anchor carrier is signaled in the PSS, SSS, PBCH or SIB.

Further, in an in-band mode, the position of the anchor carrier is at one of 32 candidate positions on both sides of the center of the system bandwidth.

Further, the position of the anchor carrier is indicated using 5 bits.

Further, information on the position of the anchor carrier, information on the system bandwidth, information on a legacy Cell Reference Signal (CRS) port, information on same—Physical Cell Identity (PCI), information on a raster offset and information on an operation mode are indicated separately. Alternatively, at least two of the information on the position of the anchor carrier, information on the system bandwidth, information on the legacy CRS port, information on same-PCI, information on the raster offset and information on the operation mode are jointly coded and indicated.

Further, information indicated by jointly coding the information on same—PCI and the information on the operation mode indicates one of: Standalone mode, Guard mode, In-band mode, with the same PCI, or In-band mode, with different PCIs.

Further, the information on the legacy CRS port is determined based on information on CRS ports in a Narrow Band—Internet of Things (NB-IoT) system.

Further, the information on the legacy CRS port indicates one of: the number of legacy CRS ports being 4, and the number of legacy CRS ports being the same as the number of CRS ports in the NB-IoT system.

Further, the information on the position of the anchor carrier, information on the system bandwidth, and information on the operation mode are indicated separately. Alternatively, any two or three of the information on the position of the anchor carrier, information on the system bandwidth, and information on the operation mode are jointly coded and indicated.

Further, the information on the position of the anchor carrier, information on the system bandwidth, information on the legacy CRS port, information on same-PCI, information on the raster offset and information on the operation mode are indicated separately. Alternatively, at least two of the information on the position of the anchor carrier, information on the system bandwidth, information on the legacy CRS port, information on same-PCI, information on the raster offset and information on the operation mode are jointly coded and indicated.

Further, the information on the legacy CRS port is determined based on information on CRS ports in a Narrow Band—Internet of Things (NB-IoT) system.

Further, the jointly coded and indicated information is signaled in the PSS, SSS, PBCH or SIB.

According to another embodiment of the present disclosure, an apparatus for information transmission is provided. The apparatus includes: a transmission module configured to transmit information or a channel over one or more of available narrow bands. The available narrow bands include available uplink narrow bands and/or available downlink narrow bands and the available narrow bands are determined based on infoimation including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB). The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH).

Further, in addition to being used in determining the available narrow bands, the position of the anchor carrier is used to indicate at least one of: scheduling information for the SIB, the number of bits or a field included in the MIB, a time-domain frequency hopping granularity, a frequency-domain frequency hopping interval, a frequency hopping pattern, and a frequency-domain position at which the information or channel is transmitted.

In an embodiment of the present disclosure, a computer storage medium is provided. The computer storage medium can store executable instructions for performing the method for information transmission in the above embodiment.

With the embodiments of the present disclosure, information or a channel is transmitted over one or more of available narrow bands. The available narrow bands include available uplink narrow bands and/or available downlink narrow bands and the available narrow bands are determined based on information including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB). The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH). It is possible to solve the problem regarding how to obtain multiple narrow bands/carriers in NB-IoT and provide a scheme for determining available narrow bands.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures.

DETAILED DESCRIPTION OF THE EMBODIMENTS

In the following, the present disclosure will be described in detail with reference to the figures, taken in conjunction with the embodiments. The embodiments, and the features thereof, can be combined with each other, provided that they do not conflict.

It is to be noted that, the terms such as "first", "second" and so on in the description, claims and figures are used for distinguishing among similar objects and do not necessarily imply any particularly order or sequence.

Figure 1:
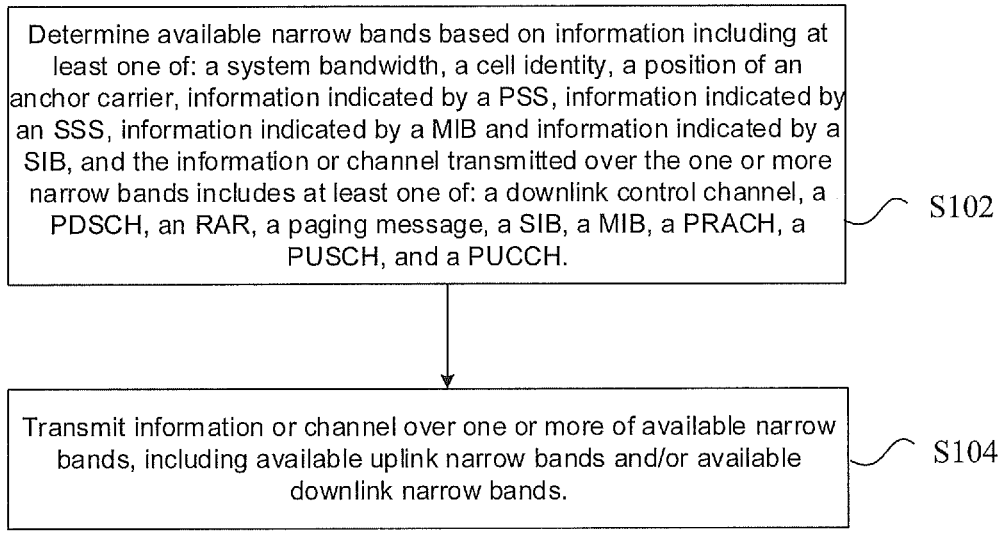
FIG. 1 is a flowchart illustrating a method for information transmission according to an embodiment of the present disclosure.

In an embodiment, a method for information transmission is provided. FIG. 1 is a flowchart illustrating a method for information transmission according to an embodiment of the present disclosure. As shown in FIG. 1, the process flow includes the following steps.

At step S102, available narrow bands are determined based on information comprising at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB) lamination or channel transmitted over the narrow bands comprises at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH).

At step S104, the information or channel is transmitted over one or more of available narrow bands. The available narrow bands include available uplink narrow bands and/or available downlink narrow bands.

With the above steps, information or a channel is transmitted over one or more of available narrow bands. The available narrow bands include available uplink narrow bands and/or available downlink narrow bands and the available narrow bands are determined based on information including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB). The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH). It is possible to solve the problem regarding how to obtain multiple narrow bands/carriers in NB-IoT and provide a scheme for determining available narrow bands.

In this embodiment, in addition to being used in determining the available narrow bands, the position of the anchor carrier is used to indicate at least one of: scheduling information for the SIB, the number of bits or a field included in the MIB, a time-domain frequency hopping granularity, a frequency-domain frequency hopping interval, a frequency hopping pattern, and a frequency-domain position at which the information or channel is transmitted.

In this embodiment, the number of available narrow bands is one of: a multiple of 2, a multiple of 3, a power of 2, a multiple of G, and an element from a set {2, 4, 8, 12 and 16}, where G is the number of Physical Resource Blocks (PRBs) included in a Resource Block Group (RBG) corresponding to the system bandwidth and G is a positive integer.

In an embodiment of the present disclosure, the number of available narrow bands is determined based on the system bandwidth.

In an embodiment of the present disclosure, the available narrow bands are at one of the following positions in within a transmission bandwidth: two ends of the transmission bandwidth, one end of the transmission bandwidth, two sides of six or seven PRBs at the center of the transmission bandwidth, one side of six or seven PRBs at the center of the transmission bandwidth, the center of the transmission bandwidth, and predetermined frequency-domain intervals over the transmission bandwidth.

In an embodiment of the present disclosure, PRBs or RBGs at two ends of the transmission bandwidth, one end of the transmission bandwidth, two sides of six or seven PRBs at the center of the transmission bandwidth, one side of six or seven PRBs at the center of the transmission bandwidth, or the center of the transmission bandwidth are one of: N consecutive PRBs or regularly spaced PRBs, N consecutive RBGs or regularly spaced RBGs, and N PRBs from N RBGs each including one PRB as an available narrow band, where N is a positive integer.

In an embodiment of the present disclosure, the available narrow bands include one of: N narrow bands within a transmission bandwidth corresponding to the system bandwidth, N narrow bands within a guard band or guard bands at one or both ends of the system bandwidth, N1 narrow bands within the transmission bandwidth corresponding to the system bandwidth and N2 narrow bands within the guard band(s) at one or both ends of the system bandwidth, and N narrow bands within all or part of guard bands of two adjacent system bandwidths in frequency domain, where N, N1 and N2 are positive integers.

In an embodiment of the present disclosure, during a random access procedure or before establishment of a Radio Resource Control (RRC) connection, or before configuration of a narrow band for a User Equipment (UE), the operation of transmitting the information or channel over the one or more of the available narrow bands includes one of:

transmitting the PRACH or PUSCH over an uplink anchor carrier that is predetermined or configured by an evolved NodeB (eNB), and transmitting the downlink control channel or PDSCH over a downlink anchor carrier or a downlink narrow band corresponding to the uplink anchor carrier, transmitting the PRACH or PUSCH over an uplink narrow band selected from a set of narrow bands based on a coverage level, and transmitting the downlink control channel or PDSCH over a downlink narrow band corresponding to the uplink narrow band or an anchor carrier, the set of narrow bands being predetermined or configured by the eNB, and transmitting the PRACH or PUSCH over a narrow band selected from a set of narrow bands, and transmitting the downlink control channel or PDSCH over a downlink narrow band corresponding to the uplink narrow band or an anchor carrier, the set of narrow bands being predetermined or configured by the eNB.

In an embodiment of the present disclosure, the available narrow bands for transmitting the paging message include one of: a downlink anchor carrier, a downlink narrow band corresponding to a PRACH narrow band at the highest coverage level, and a downlink narrow band determined from a set of paging narrow bands based on a UE identity, the set of paging narrow bands being predetermined or configured via the SIB.

In an embodiment of the present disclosure, a subframe for transmitting the paging message is determined based on a type of the narrow band for transmitting the paging message.

In an embodiment of the present disclosure, a position of the anchor carrier is signaled in the PSS, SSS, PBCH or SIB.

In an embodiment of the present disclosure, information on the position of the anchor carrier, information on the system bandwidth, information on a legacy Cell Reference Signal (CRS) port, information on same—Physical Cell Identity (PCI), information on a raster offset and information on an operation mode are indicated separately. Alternatively, at least two of the information on the position of the anchor carrier, information on the system bandwidth, information on the legacy CRS port, information on same-PCI, information on the raster offset and information on the operation mode are jointly coded and indicated.

In an embodiment of the present disclosure, the information on the legacy CRS port is determined based on information on CRS ports in a Narrow Band—Internet of Things (NB-IoT) system.

In an embodiment of the present disclosure, the jointly coded and indicated information is signaled in the PSS, SSS, PBCH or SIB.

Further, in an in-band mode, the position of the anchor carrier is at one of 32 candidate positions on both sides of the center of the system bandwidth.

Further, the position of the anchor carrier is indicated using 5 bits.

Further, information on the position of the anchor carrier, information on the system bandwidth, information on a legacy Cell Reference Signal (CRS) port, information on same—Physical Cell Identity (PCI), information on a raster offset and information on an operation mode are indicated separately. Alternatively, at least two of the information on the position of the anchor carrier, information on the system bandwidth, information on the legacy CRS port, information on same-PCI, information on the raster offset and information on the operation mode are jointly coded and indicated.

Further, information indicated by jointly coding the information on same—PCI and the information on the operation mode indicates one of: Standalone mode, Guard mode, In-band mode, with the same PCI, or In-band mode, with different PCIs.

Further, the information on the legacy CRS port is determined based on information on CRS ports in a Narrow Band—Internet of Things (NB-IoT) system.

Further, the information on the legacy CRS port indicates one of: the number of legacy CRS ports being 4, and the number of legacy CRS ports being the same as the number of CRS ports in the NB-IoT system.

According to an embodiment of the present disclosure, an apparatus for information transmission is also provided. The apparatus can implement the above embodiments and preferred embodiments and details thereof will be omitted here. As used hereinafter, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 2:
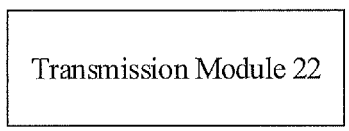
FIG. 2 is a block diagram showing a structure of an apparatus for information transmission according to an embodiment of the present disclosure.

FIG. 2 is a block diagram showing a structure of an apparatus for information transmission according to an embodiment of the present disclosure. As shown in FIG. 2, the apparatus includes a transmission module 22 configured to transmit information or a channel over one or more of available narrow bands. The available narrow bands include available uplink narrow bands and/or available downlink narrow bands and the available narrow bands are determined based on information including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB).

The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH).

With the above apparatus, the transmission module 22 transmits information or a channel over one or more of available narrow bands. The available narrow bands include available uplink narrow bands and/or available downlink narrow bands and the available narrow bands are determined based on information including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB). The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH). It is possible to solve the problem regarding how to obtain multiple narrow bands/carriers in NB-IoT and provide a scheme for determining available narrow bands.

In an embodiment of the present disclosure, in addition to being used in determining the available narrow bands, the position of the anchor carrier is used to indicate at least one of: scheduling information for the SIB, the number of bits or a field included in the MIB, a time-domain frequency hopping granularity, a frequency-domain frequency hopping interval, a frequency hopping pattern, and a frequency-domain position at which the information or channel is transmitted.

In an embodiment of the present disclosure, the number of available narrow bands is determined based on the system bandwidth.

In an embodiment of the present disclosure, the available narrow bands are at one of the following positions in within a transmission bandwidth: two ends of the transmission bandwidth, one end of the transmission bandwidth, two sides of six or seven PRBs at the center of the transmission bandwidth, one side of six or seven PRBs at the center of the transmission bandwidth, the center of the transmission bandwidth, and predeteunined frequency-domain intervals over the transmission bandwidth.

In an embodiment of the present disclosure, PRBs or RBGs at two ends of the transmission bandwidth, one end of the transmission bandwidth, two sides of six or seven PRBs at the center of the transmission bandwidth, one side of six or seven PRBs at the center of the transmission bandwidth, or the center of the transmission bandwidth are one of: N consecutive PRBs or regularly spaced PRBs, N consecutive RBGs or regularly spaced RBGs, and N PRBs from N RBGs each including one PRB as an available narrow band, where N is a positive integer.

In an embodiment of the present disclosure, the available narrow bands include one of: N narrow bands within a transmission bandwidth corresponding to the system bandwidth, N narrow bands within a guard band or guard bands at one or both ends of the system bandwidth, N1 narrow bands within the transmission bandwidth corresponding to the system bandwidth and N2 narrow bands within the guard band(s) at one or both ends of the system bandwidth, and N narrow bands within all or part of guard bands of two adjacent system bandwidths in frequency domain, where N, N1 and N2 are positive integers.

In an embodiment of the present disclosure, during a random access procedure or before establishment of a Radio Resource Control (RRC) connection, or before configuration of a narrow band for a User Equipment (UE), the operation of transmitting the information or channel over the one or more of the available narrow bands includes one of:

transmitting the PRACH or PUSCH over an uplink anchor carrier that is predetermined or configured by an evolved NodeB (eNB), and transmitting the downlink control channel or PDSCH over a downlink anchor carrier or a downlink narrow band corresponding to the uplink anchor carrier, transmitting the PRACH or PUSCH over an uplink narrow band selected from a set of narrow bands based on a coverage level, and transmitting the downlink control channel or PDSCH over a downlink narrow band corresponding to the uplink narrow band or an anchor carrier, the set of narrow bands being predetermined or configured by the eNB, and transmitting the PRACH or PUSCH over a narrow band selected from a set of narrow bands, and transmitting the downlink control channel or PDSCH over a downlink narrow band corresponding to the uplink narrow band or an anchor carrier, the set of narrow bands being predetermined or configured by the eNB.

In an embodiment of the present disclosure, the available narrow bands for transmitting the paging message include one of: a downlink anchor carrier, a downlink narrow band corresponding to a PRACH narrow band at the highest coverage level, and a downlink narrow band determined from a set of paging narrow bands based on a UE identity, the set of paging narrow bands being predetermined or configured via the SIB.

In an embodiment of the present disclosure, a subframe for transmitting the paging message is determined based on a type of the narrow band for transmitting the paging message.

In an embodiment of the present disclosure, a position of the anchor carrier is signaled in the PSS, SSS, PBCH or SIB.

In an embodiment of the present disclosure, the information on the position of the anchor carrier, information on the system bandwidth, and information on the operation mode are indicated separately. Alternatively, any two or three of the information on the position of the anchor carrier, information on the system bandwidth, and information on the operation mode are jointly coded and indicated.

It should be noted that each of the above-described modules can be realized by means of software or hardware, and the latter can be realized by, but not limited to, the following manner: the above-mentioned modules are located at the same processor, or the above-mentioned modules are distributed at a plurality of processors.

In the following, preferred embodiments of the present disclosure will be explained in detail.

The preferred embodiments of the present disclosure will be explained with reference to e.g., an NB-IoT system. However, the methods in the preferred embodiments of the present disclosure are not limited to be applied in the NB-IoT system.

Preferred Embodiment 1

In this embodiment, a PRB or narrow band for transmitting an NB-PSS/SSS is referred to as an anchor carrier. In the embodiments of the present disclosure, "NB-" indicates information/channel used in the NB-IoT system. An eNB signals PRB information for the anchor carrier and a system bandwidth to a UE.

For the system bandwidth, each PRB can be used as the anchor carrier. Alternatively, only a part of PRBs can be used as the anchor carrier. For example, only PRBs each having a center frequency with a raster offset smaller than 7.5 kHz from multiples of 100 kHz can be used as the anchor carrier. In the system bandwidth of 5 MHz, indices of the PRBs that can be used as the anchor carrier include PRB #2, 7, 13 and 22. In this case, the PRB information for the anchor carrier can be indicated using 2 bits.

The eNB can signal the PRB information for the anchor carrier and the system bandwidth to the UE via NB-PBCH, NB-SIB, NB-PSS or NB-SSS.

Optionally, in the NB-PBCH, NB-SIB, NB-PSS or NB-SSS, the system bandwidth and the PRB information can be indicated separately. For example, five system bandwidths can be indicated using 3 bits and the PRB information can be indicated using 2 bits. Alternatively, the system bandwidth and the PRB information can be jointly coded and indicated. For example, when there are five system bandwidths each having eight different PRB positions, 6 bits are needed to indicate the 40 states in total.

In another example, the indices of the PRBs available in the respective system bandwidth can be shown in Table 1 below.

TABLE 1

| System Bandwidth | PRB Indices |
| --- | --- |
| 3 MHz | 2, 12 |
| 5 MHz | 2, 7, 17, 22 |
| 15 MHz | 2, 7, 12, 17, 22, 27, 32, 42, 47, 52, 57, 62, 67, 72 |
| 10 MHz | 4, 9, 14, 19, 30, 35, 40, 45 |
| 20 MHz | 4, 9, 14, 19, 24, 29, 34, 39, 44, 55, 60, 65, 70, 75, 80, 85, 90, 95 |

There are in total 46 PRB indices, which can be indicated using 6 bits. The 6 bits indicate the system bandwidth and the corresponding PRB indices, as shown in Table 2 below.

TABLE 2

| Value | System Bandwidth | PRB Index |
| --- | --- | --- |
| 0 | 3 MHz | 2 |
| 1 | 3 MHz | 12 |
| 2 | 5 MHz | 2 |
| 3 | 5 MHz | 7 |
| 4 | 5 MHz | 12 |
| 5 | 5 MHz | 22 |

TABLE 2-continued

| Value | System Bandwidth | PRB Index |
|---|---|---|
| 6 | 15 MHz | 2 |
| 7 | 15 MHz | 7 |
| 8 | 15 MHz | 12 |
| 9 | 15 MHz | 17 |
| 10 | 15 MHz | 22 |
| 11 | 15 MHz | 27 |
| 12 | 15 MHz | 32 |
| 13 | 15 MHz | 42 |
| 14 | 15 MHz | 47 |
| 15 | 15 MHz | 52 |
| 16 | 15 MHz | 57 |
| 17 | 15 MHz | 62 |
| 18 | 15 MHz | 67 |
| 19 | 15 MHz | 72 |
| 20 | 10 MHz | 4 |
| 21 | 10 MHz | 9 |
| 22 | 10 MHz | 14 |
| 23 | 10 MHz | 19 |
| 24 | 10 MHz | 30 |
| 25 | 10 MHz | 35 |
| 26 | 10 MHz | 40 |
| 27 | 10 MHz | 45 |
| 28 | 20 MHz | 4 |
| 29 | 20 MHz | 9 |
| 30 | 20 MHz | 14 |
| 31 | 20 MHz | 19 |
| 32 | 20 MHz | 24 |
| 33 | 20 MHz | 29 |
| 34 | 20 MHz | 34 |
| 35 | 20 MHz | 39 |
| 36 | 20 MHz | 44 |
| 37 | 20 MHz | 55 |
| 38 | 20 MHz | 60 |
| 39 | 20 MHz | 65 |
| 40 | 20 MHz | 70 |
| 41 | 20 MHz | 75 |
| 42 | 20 MHz | 80 |
| 43 | 20 MHz | 85 |
| 44 | 20 MHz | 90 |
| 45 | 20 MHz | 95 |
| 46~63 | Reserved | |

Alternatively, the system bandwidth may not be signaled. The PRB indices in Table 1 are at 32 positions on both sides of DC. In this case, 5 bits are needed to indicate them.

Optionally, the eNB can signal the PRB indices of uplink narrow bands to the UE. For example, when the uplink system bandwidth is different from the downlink system bandwidth, the eNB can signal the system bandwidth along with the PRB indices. There are 15+25+50+75+100=265 states in total, which needs 9 bits to indicate.

Optionally, the system bandwidth, PRB information and operation mode can be indicated separately or coded jointly. For example, there are three operation modes: in-band mode, standalone mode and guard band mode. In this case, there are in total 49 states, including the above 46 states, and thus 6 bits are needed to indicate them.

Optionally, 2-bit information can indicate the operation mode of the UE and resource mapping information. For example, "00" indicates the guard band mode, "01" indicates the standalone mode, "10" indicates the in-band mode, with resource mapping for two CRS ports, and "11" indicates the in-band mode, with resource mapping for four CRS ports.

Figure 3:
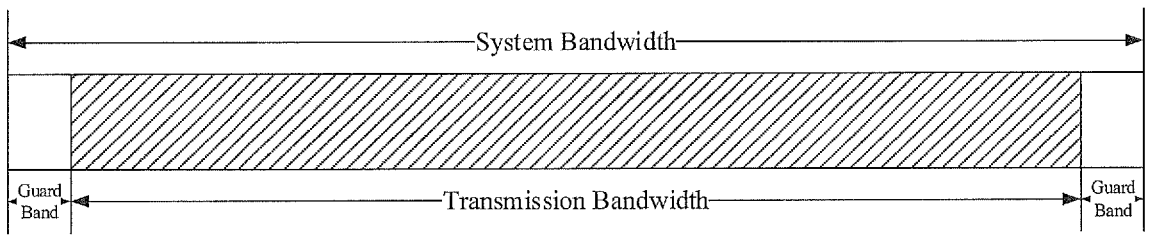
FIG. 3 is a schematic diagram showing a system bandwidth of 20 MHz according to a preferred embodiment of the present disclosure.

In the related art, a system bandwidth in the LTE system refers to an overall bandwidth including a transmission bandwidth and guard bands on its both sides. There are several system bandwidths in the LTE system: 1.4 MHz, 3 MHz, 5 MHz, 10 MHz, 15 MHz and 20 MHz. Each system bandwidth has a corresponding transmission bandwidth, which is a bandwidth usable for transmission in the system bandwidth. For example, for the above system bandwidths, their respective transmission bandwidths are 6 PRBs, 15 PRBs, 25 PRBs, 50 PRBs, 75 PRBs and 100 PRBs. Within the system bandwidth, the portions on two sides of the transmission bandwidth are guard bands. FIG. 3 is a schematic diagram showing a system bandwidth of 20 MHz according to a preferred embodiment of the present disclosure.

In Embodiment 1, a method for determining narrow bands is provided. A UE can determine positions of available narrow bands based on the system bandwidth. Here, the available narrow bands include available uplink narrow bands and/or available downlink narrow bands. That is, the positions of the available narrow bands are dependent solely on the system bandwidth. Once the UE obtains the system bandwidth, it can determine the positions of the available narrow bands. For example, the UE can determine the positions of the available downlink narrow bands and the available uplink narrow bands are signaled in a SIB. Alternatively, the UE can determine both the available downlink narrow bands and the available uplink narrow bands based on the system bandwidth. Other channels in the NB-IoT can be transmitted in the available narrow bands, such as NB-SIB, NB-PDCCH, NB-PDSCH, NB-paging and NB-RAR in downlink, or NB-PRACH, NB-PUSCH and NB-PUCCH in uplink.

The number of available uplink narrow bands and the number of available downlink narrow bands may or may not be the same. The available uplink narrow bands and the available downlink narrow bands may or may not be at the same positions within the system bandwidth.

Optionally, the available uplink narrow bands and the available downlink narrow bands are paired in a predetermined manner. For example, there can be 8 available uplink narrow bands, having indices of 0~7 from low frequency to high frequency, and 8 available downlink narrow bands, having indices of 0~7 from low frequency to high frequency. One uplink narrow band and one downlink narrow band, having the same index, can be paired and configured for the UE pairwise. If the UE transmits uplink data over an available uplink narrow band, it can receive downlink data over an available downlink narrow band corresponding to the available uplink narrow band. Alternatively, the available uplink narrow bands and the available downlink narrow bands can be configured arbitrarily. For example, the eNB can configure for the UE an available uplink narrow band and an available downlink narrow band separately. Alternatively, the above two schemes can be mixed, e.g., some narrow bands can be paired and some others can be configured arbitrarily. In an example, the system may have three narrow bands available for transmission of PRACH, corresponding to three downlink narrow bands, respectively, and other narrow bands can be configured arbitrarily. Alternatively, in random access, the system may have three narrow bands available for transmission of PRACH, corresponding to 3 downlink narrow bands, respectively. When the eNB configures a narrow band specific to the UE, all narrow bands can be configured arbitrarily.

When the narrow band at which the information/channel is transmitted is configured, it can be indicated based on the available narrow bands for saving signaling overhead. For example, when there are in total 16 available narrow bands, they can be numbered as 0~15 from low frequency to high frequency and indicated using 4 bits. The resource allocation for NB-PDSCH/NB-PUSCH can also be based on the available narrow bands. For example, when there are in total 16 available narrow bands, the narrow band for transmission can be indicated using 4 bits.

The positions of the available narrow bands will be explained in the following.

1) The available narrow bands can be in a transmission bandwidth of LTE.

This example can be applied to the available uplink narrow bands/the available downlink narrow bands.

The available narrow bands can be all PRBs within the transmission bandwidth.

Alternatively, the available uplink narrow bands can be located at both ends of the transmission bandwidth.

For example, a transmission bandwidth of 20 MHz contains 100 PRBs. There are in total 16 available narrow bands, i.e., 16 PRBs arranged symmetrically at two ends of the transmission bandwidth and having indices of 0~7 and 92~99. In another example, a transmission bandwidth of 10 MHz contains 50 PRBs. There are in total 8 available narrow bands, i.e., 8 PRBs arranged symmetrically at two ends of the transmission bandwidth and having indices of 0~3 and 45~49. Preferably, the available narrow bands are aligned with RBGs. The available narrow bands can be a number of RBGs at two ends. In a scheme, the last RBG containing less PRBs is removed and the available narrow bands belong to the remaining RBGs. For example, a system bandwidth of 5 MHz contains 25 PRBs and 13 RBGs. In the first 12 RBGs (having indices of 0~11), each RBG (having an index of 12) contains 2 PRBs. The last RBG contains 1 PRB and cannot be used as an available narrow band. Then, 4 RBGs are used as available narrow bands. There are in total 8 available narrow bands, i.e., RBG #0, 1, 10 and 11. That is, the last RBG containing less than 2 PRBs is not used as an available narrow band. In this way, the available narrow bands are aligned with the RBGs, which is advantageous for resource allocation for legacy UEs. Alternatively, the last RBG containing less PRBs is not removed and 4 RBGs are used as available narrow bands. There are in total 7 available narrow bands, i.e., RBG #0, 1, 11 and 12.

Optionally, an offset of the available narrow bands can be determined based on the system bandwidth. The offset is an offset of the available narrow bands from an edge of the transmission bandwidth. For example, a transmission bandwidth of 20 MHz contains 100 PRBs. There are in total 16 available narrow bands. The indices of the PRBs corresponding to the available narrow bands are indices of 0~7 and 92~99 when the offset is 0, or 8~15 and 84~91 when the offset is 1.

Optionally, the available narrow bands can be PRBs or RBGs occurring at predetermined intervals. For example, a transmission bandwidth of 20 MHz contains 100 PRBs. There are in total 8 available narrow bands, which are 8 PRBs arranged symmetrically at two ends of the transmission bandwidth and occurring at a predetermined interval of 2, i.e., PRB indices of 0, 2, 4, 6, 92, 94, 96 and 98, or 0, 2, 4, 6, 93, 95, 97 and 99.

Optionally, the available narrow bands can be N consecutive PRBs or regularly spaced PRBs, N consecutive RBGs or regularly spaced RBGs, and N PRBs from N RBGs each including one PRB as an available narrow band, at two ends of the transmission bandwidth. Optionally, the position of the PRB in each RBG can be determined based on a cell identity. For example, when $n_{ID}^{cell}$ mod G=0, the available narrow band is the $1^{st}$ PRB in each RBG; when $n_{ID}^{cell}$ mod G=1, the available narrow band is the $2^{nd}$ PRB in each RBG; and so on, where $n_{ID}^{cell}$ is a cell identity and G is the number of PRBs included in each RBG corresponding to the system bandwidth.

Alternatively, the available narrow bands can be N consecutive PRBs or regularly spaced PRBs, N consecutive RBGs or regularly spaced RBGs, and N PRBs from N RBGs each including one PRB as an available narrow band, at one end of the transmission bandwidth.

The available narrow bands can be a number of PRBs or RBGs. The last RBG containing less PRBs may or may not be used as an available narrow band, as described above. For example, a transmission bandwidth of 20 MHz contains 100 PRBs. There are in total 16 available narrow bands, corresponding to PRBs having indices of 0~15. Alternatively, the available narrow bands can be PRBs or RBGs occurring at predeteiiiiined intervals. For example, a transmission bandwidth of 20 MHz contains 100 PRBs. There are in total 8 available narrow bands, which are 8 PRBs arranged symmetrically at two ends of the transmission bandwidth and occurring at a predetermined interval of 2, i.e., PRB indices of 0, 2, 4, 6, 8, 10, 12 and 14. Alternatively, the available narrow bands can be N PRBs from N RBGs each including one PRB as an available narrow band, at one end of the transmission bandwidth.

Alternatively, the available narrow bands can be N consecutive PRBs or regularly spaced PRBs, N consecutive RBGs or regularly spaced RBGs, and N PRBs from N RBGs each including one PRB as an available narrow band, on two sides of six or seven PRBs at the center of the transmission bandwidth.

The available narrow bands can be a number of PRBs or RBGs. The last RBG containing less PRBs may or may not be used as an available narrow band, as described above. For an even bandwidth, the available narrow bands can be arranged on two sides of six PRBs at the center of the transmission bandwidth. For an odd bandwidth, the available narrow bands can be arranged on two sides of seven PRBs at the center of the transmission bandwidth.

For example, a transmission bandwidth of 20 MHz contains 100 PRBs. There are in total 16 available narrow bands, corresponding to PRBs having indices of 39~46 and 53~60. In another example, a transmission bandwidth of 5 MHz contains 25 PRBs. There are in total 4 available narrow bands, corresponding to PRBs having indices of 7, 8, 16 and 17, or RBG #9, 10, 14 and 15. Alternatively, the available narrow bands can be PRBs or RBGs occurring at predetermined intervals. Alternatively, the available narrow bands can be N PRBs from N RBGs each including one PRB as an available narrow band, on two sides of six or seven PRBs at the center of the transmission bandwidth.

Alternatively, the available narrow bands can be N consecutive PRBs or regularly spaced PRBs, N consecutive RBGs or regularly spaced RBGs, and N PRBs from N RBGs each including one PRB as an available narrow band, on one side of six or seven PRBs at the center of the transmission bandwidth.

The available narrow bands can be a number of PRBs or RBGs. The last RBG containing less PRBs may or may not be used as an available narrow band, as described above. For an even bandwidth, the available narrow bands can be arranged on two sides of six PRBs at the center of the transmission bandwidth. For an odd bandwidth, the available narrow bands can be arranged on two sides of seven PRBs at the center of the transmission bandwidth.

For example, a transmission bandwidth of 20 MHz contains 100 PRBs. There are in total 16 available narrow bands, corresponding to PRBs having indices of 31~46. In another example, a transmission bandwidth of 5 MHz contains 25 PRBs. There are in total 4 available narrow bands, corresponding to PRBs having indices of 5, 6, 7 and 8.

Alternatively, the available narrow bands can be PRBs or RBGs occurring at predetermined intervals. Alternatively, the available narrow bands can be N PRBs from N RBGs each including one PRB as an available narrow band, on one side of six or seven PRBs at the center of the transmission bandwidth.

Alternatively, the available narrow bands can be N consecutive PRBs or regularly spaced PRBs, N consecutive RBGs or regularly spaced RBGs, and N PRBs from N RBGs each including one PRB as an available narrow band, at the center of the transmission bandwidth.

The available narrow bands can be a number of PRBs or RBGs. This is more suitable for available uplink narrow bands, since the six or seven PRBs at the center of the downlink in NB-IoT are unavailable. Alternatively, the available narrow bands can be PRBs or RBGs occurring at predetermined intervals. Alternatively, the available narrow bands can be N PRBs from N RBGs each including one PRB as an available narrow band, at the center of the transmission bandwidth.

Alternatively, the available narrow bands can be PRBs occurring at predetermined intervals. For example, starting from PRB #0, one out of every four PRBs is an available narrow band. The position of the one PRB in the four PRBs can be determined based on a cell identity. For the downlink, the available narrow bands can be obtained from all PRBs in the transmission bandwidth, with the narrow bands overlapping the six or seven PRBs at the center being unavailable. Alternatively, the available narrow bands can be obtained from the PRBs in the transmission bandwidth other than the six or seven PRBs at the center. For example, a system bandwidth of 20 MHz corresponds to 100 PRBs. Among the remaining 100−6=94 PRBs, starting from PRB #0, one out of every four PRBs is an available narrow band.

For example, a transmission bandwidth of 20 MHz contains 100 PRBs. There are in total 16 available narrow bands, corresponding to PRBs having indices of 42~57.

In practice, the present disclosure is not limited to the above examples.

2) The available narrow bands can be in one or more guard bands.

Each system bandwidth corresponds to a number of available narrow bands, e.g., narrow bands consisting of all or part of 12 consecutive sub-carriers each having a center frequency with a raster offset smaller than 7.5 kHz from multiples of 100 KHz in a guard band or guard bands on one or two sides of the transmission bandwidth, narrow bands arranged near an edge frequency or frequencies of the transmission bandwidth, narrow bands arranged near an edge frequency or frequencies of the system bandwidth, or narrow bands arranged between the edge frequency or frequencies of the transmission bandwidth and the edge frequency or frequencies of the system bandwidth.

Alternatively, from the edge(s) of the guard band(s) on one or two sides of the transmission bandwidth to the edge(s) of the system bandwidth, every 12 sub-carriers can form a narrow band. The available narrow bands can be all or part of the foiiiied narrow bands. The narrow bands can be arranged near the edge frequency or frequencies of the transmission bandwidth, near the edge frequency or frequencies of the system bandwidth, or between the edge frequency or frequencies of the transmission bandwidth and the edge frequency or frequencies of the system bandwidth.

Alternatively, from the edge(s) of the guard band(s) on one or two sides of the system bandwidth to the edge(s) of the transmission bandwidth, every 12 sub-carriers can form a narrow band. The available narrow bands can be all or part of the formed narrow bands. The narrow bands can be arranged near the edge frequency or frequencies of the transmission bandwidth, near the edge frequency or frequencies of the system bandwidth, or between the edge frequency or frequencies of the transmission bandwidth and the edge frequency or frequencies of the system bandwidth.

Alternatively, the available narrow bands occur at predetermined intervals.

Optionally, the available narrow bands can be narrow bands within guard bands of two adjacent bandwidths in frequency, e.g., narrow bands within guard bands of two adjacent 20 MHz system bandwidths.

3) Some of the available narrow bands can be in the transmission bandwidth and others can be in the guard band(s).

Each system bandwidth corresponds to a number of PRBs within the transmission bandwidth and a number of narrow bands in the guard band(s). The positions of the available narrow bands are similar as described above. For example, the available narrow bands can be a number of PRBs at the edge(s) of the transmission bandwidth and a number of narrow bands in the guard band(s).

Preferably, the number of available uplink/downlink narrow bands can be a multiple of 2, e.g., 2, 6, 8, 10 . . . , or a power of 2, e.g., 2, 4, 8, 16 . . . Such number of available narrow bands is advantageous for resource indication or symmetric frequency hopping. Alternatively, the number of available uplink/downlink narrow bands can be a multiple of 2, 3 or 4. Since 2, 3 or 4 is the number of PRBs included in an RBG in the existing LTE system, it is advantageous for resource allocation for legacy UEs to use an integer number of RBGs as the available narrow bands. Alternatively, the number of available uplink/downlink narrow bands can be a multiple of the RBG size within the transmission bandwidth. For example, for a system bandwidth of 10 MHz, the RBG size is 3 and the number of available narrow bands can be a multiple of 3, e.g., 3, 6, 9 and so on.

Preferably, the number of available uplink/downlink narrow bands can be selected from the set {2, 4, 8, 12, 16}. Here, the set contains the numbers of narrow bands in the transmission bandwidth for Enhanced Machine Type Communications (eMTC). The multi-narrow-band operations of NB-IoT can reuse the eMTC technique. Alternatively, the number of the available narrow bands can be deter mined based on the system bandwidth. For example, the system bandwidth of 3 MHz, 5 MHz, 10 MHz, 15 MHz or 20 MHz corresponds to the number of available narrow bands of 2, 4, 8, 12 or 16. Alternatively, the number of available narrow bands can be a multiple of 2, 4, 8, 12 or 16.

Alternatively, the UE can obtain the available narrow bands based on the system bandwidth and a cell identity. For example, the number of available narrow bands can be dependent on the system bandwidth and the positions of the available narrow bands can be dependent on the cell identity. For example, in an in-band scenario, the number of available narrow bands can be 4 for a system bandwidth lower than or equal to 5 MHz, or 8 for a system bandwidth higher than 5 MHz. The available narrow bands can be at the end having the lowest frequency when the cell identity is odd, or at the end having the highest frequency when the cell identity is even. In practice, the present disclosure is not limited to the above examples.

Alternatively, the UE can obtain the available narrow bands based on a cell identity, as described above.

Preferred Embodiment 2

In this embodiment, a method for information transmission is provided.

In a system bandwidth, there are a number of candidate positions for an anchor carrier. For example, in the in-band mode, for a system bandwidth of 5 MHz, the candidate positions are PRB #1, 7, 17 and 22. The position of the anchor carrier can be indicated using 2-bit information. Similarly, in the guard band mode or the in-band & guard band hybrid mode, the position of the anchor carrier can also be indicated by means of candidate positions. The information includes at least one of:

the number of available narrow bands and/or positions of the available narrow bands, e.g., four positions of the anchor carrier correspond to four positions of available narrow bands (referring to Preferred Embodiment 1 for examples of the positions of available narrow bands); scheduling information for NB-SIB, which can be NB-SIB1 here or other SIB messages, including at least one of: a TBS, a frequency-domain position, a frequency hopping parameter, a time-domain position and a transmission period of the NB-SIB (Here, the frequency hopping parameter of the NB-SIB includes at least one of: a position of a frequency hopping narrow band, a time-domain frequency hopping granularity (e.g., one frequency hop every 10 ms), a frequency-domain frequency hopping interval (e.g., an offset of one PRB per frequency hop). For example, the NB-SIB can have two TBSs indicated by the position of the anchor carrier. For example, the position of the NB-SIB narrow band can be indicated by the position of the anchor carrier. For example, a subframe in which the NB-SIB is transmitted can be indicated by the position of the anchor carrier, e.g., the subframe can be Subframe #5 or 9. For example, the transmission period of the NB-SIB can be indicated by the position of the anchor carrier, e.g., the transmission period can be 20 ms or 40 ms.);

the number of bits or a field included in the MIB, e.g., the anchor carrier corresponds to 4 fields when it is in Narrow Band #1, or 8 fields when it is in Narrow Band #2;

a time-domain frequency hopping granularity, applicable to all or part of channels, e.g., there can be four granularities, 10 ms, 20 ms, 40 ms and 80 ms;

a frequency-domain frequency hopping interval, applicable to all or part of channels, e.g., there can be four intervals, an offset of 1 PRB, an offset of 2 PRBs, an offset of 3 PRBs and an offset of 4 PRBs;

a frequency hopping pattern, applicable to all or part of channels, e.g., a frequency hopping with a fixed frequency-domain interval, or a symmetrical frequency hopping similar to the existing Physical Uplink Control Channel (PUCCH); and a frequency-domain position of at least one of the following information or channel: a Narrow Band Physical Downlink Control Channel (NB-PDCCH), a Narrow Band Physical Downlink Shared Channel (NB-PDSCH), a Narrow Band Random Access Response (NB-RAR), a narrow band paging message, a Narrow Band SIB (NB-SIB), and a Narrow Band MIB (NB-MIB).

Preferred Embodiment 3

In this embodiment, a method for signaling available narrow bands is provided.

In this embodiment, the number of available narrow bands and/or positions of the available narrow bands can be signaled in NB-PSS/NB-SSS/NB-MIB/NB-SIB.

For example, the number of available narrow bands can be fixed or determined based on a system bandwidth. The positions of the available narrow bands can be signaled in NB-PSS/NB-SSS/NB-MIB/NB-SIB. For the positions of the available narrow bands, reference can be made to Embodiment 1. For example, in an in-band scenario, the available narrow bands can be arranged on one or two sides of the system bandwidth, one or two sides of six or seven PRBs at the center of the system bandwidth, etc. Similar cases apply for other scenarios.

Alternatively, the positions can be fixed. For example, in the guard band mode, the available narrow bands can be a number of available narrow bands near an edge frequency or frequencies of a transmission band. The number of available narrow bands can be signaled in NB-PSS/NB-SSS/NB-MIB/NB-SIB. In another example, the available narrow bands can be PRBs at two ends of the transmission bandwidth. Two bits in MIB/SIB can be used to indicate the number of available narrow bands as one of 2, 4, 8 and 16. It can also be indicated by the number of PBGs. For example, two bits can be used to indicate the RBGs corresponding to the available narrow bands are one of 2, 4, 8 and 16.

Alternatively, both the number of the available narrow bands and the positions of the available narrow bands can be signaled. For example, there may be two positions and four numbers, which needs to be indicated by 3 bits.

Alternatively, indices of the PRB/available narrow bands can be signaled directly in NB-PSS/NB-SSSNB-MIB/NB-SIB. In the guard band mode or the in-band & guard band hybrid mode, a number of available narrow bands can be defined in a standard and numbered.

Alternatively, it can be indicated using a bitmap for RBGs. For example, in an in-band mode, for a system of 20 MHz, 25 bits are needed for indication.

Alternatively, it can be indicated using an existing indication for resource allocation, e.g., Resource Allocation Type 0, 1 or 2.

In the standalone mode, the positions of the narrow bands can be indicated in NB-PSS/NB-SSS/NB-MIB/NB-SIB. For example, an offset of a narrow band from an anchor carrier can be indicated, e.g., an offset of one or two narrow bands. Alternatively, only the number of available narrow bands can be indicated and the positions can be predetermined, e.g., a number of narrow bands on both sides of the anchor carrier. Alternatively, the narrow bands can be indexed in a predetermined manner and the indices of the narrow bands can be signaled in NB-PSS/NB-SSS/NB-MIB/NB-SIB. For example, a narrow band adjacent to the lowest frequency of the anchor carrier can have an index of 0, a narrow band adjacent to the highest frequency of the anchor carrier can have an index of 1, a narrow band adjacent to the lowest frequency of the narrow band #0 can have an index of 2, a narrow band adjacent to the highest frequency of the narrow band #1 can have an index of 3, and so on.

Preferred Embodiment 4

In this embodiment, a method for obtaining available narrow bands is provided.

Information on available narrow bands can be obtained from at least one of a system bandwidth, a cell identity, a position of an anchor carrier, and information contained in NB-PSS/NB-SSS/NB-MIB/NB-SIB. For example, a part of the information on the available narrow bands can be obtained from one of the above and the remaining part of the information on the available narrow bands can be obtained from another.

For example, the position of the anchor carrier and the system bandwidth collectively correspond to a reference position of the available narrow bands, e.g., one end of a transmission bandwidth. The cell identity corresponds to a predetermined offset from the reference position, e.g., an offset of one PRB. The positions of the available narrow bands can be obtained by applying the offset. The number (e.g., 4) of available narrow bands can be indicated by NB-PSS/NB-SSS-MB/NB-SM.

Preferred Embodiment 5

In this embodiment, a method for transmitting information or a channel is provided.

Scheme 1: There is one anchor carrier in uplink for a UE to transmit a PRACH. The anchor carrier can be determined in a predefined manner, e.g., the uplink anchor carrier corresponds to the same PRB index as a downlink anchor carrier, or configured by an eNB. In practice, the present disclosure is not limited to the above example.

During a random access procedure or before an RRC connection has established or before a narrow band has been configured by the eNB for the UE, the UE is operating on the anchor carrier. The UE transmits a PRACH/Message 3 on the uplink anchor carrier and receives an RAR/Message 4 on the downlink anchor carrier or on a downlink narrow band corresponding to the PRACH narrow band. The downlink narrow band is predetermined or configured by the eNB. Once the eNB has configured for the UE a pair of uplink and downlink narrow bands, e.g., a PRB index corresponding to the uplink narrow band and a PRB index corresponding to the downlink narrow band, the UE can detect a control channel on the configured downlink narrow band. A PDSCH is transmitted on the downlink narrow band and a PUSCH is transmitted on the uplink narrow band. Optionally, the resource of PDSCH/PUSCH is allocated within the narrow bands. Before the eNB has configured for the UE the pair of uplink and downlink narrow bands, the UE is operating on the uplink and downlink anchor carriers. Optionally, the eNB can configured for the UE the pair of uplink and downlink narrow bands in Message 4.

Scheme 2: There is a plurality of narrow bands or PRBs for transmission of PRACH. The plurality of narrow bands can be predetermined or configured by the eNB, e.g., in a SIB. The UE can select one of the narrow bands for transmitting the PRACH. Preferably, the plurality of narrow bands for transmission of PRACH corresponds to different coverage levels, respectively. For example, there are three narrow bands corresponding to three coverage levels, respectively, or five narrow bands, in which case two coverage levels each correspond to two narrow bands and the remaining one coverage level corresponds to the remaining narrow band. During a random access procedure or before an RRC connection has established or before a narrow band has been configured by the eNB for the UE, the UE transmits a PUSCH and a PRACH in the same narrow band. The narrow band at which the UE receives an RAR/Message 4 can be an anchor carrier. Alternatively, each narrow band for transmitting the PRACH corresponds to one downlink narrow band. When the UE transmits the PRACH/Message 3 on a narrow band, it will receive the RAR/Message 4 on the corresponding downlink narrow band. The downlink narrow band can be configured by the eNB, e.g., in a SIB. For example, the narrow band for transmitting the PRACH and its corresponding downlink narrow band can be configured in the SIB, respectively.

Once the eNB has configured for the UE a pair of uplink and downlink narrow bands, e.g., a PRB index corresponding to the uplink narrow band and a PRB index corresponding to the downlink narrow band, the UE can detect a control channel on the configured downlink narrow band. A PDSCH is transmitted on the downlink narrow band and a PUSCH is transmitted on the uplink narrow band. Optionally, the resource of PDSCH/PUSCH is allocated within the narrow bands. Before the eNB has configured for the UE the pair of uplink and downlink narrow bands, the UE is operating on the uplink and downlink anchor carriers. Optionally, the eNB can configured for the UE the pair of uplink and downlink narrow bands in Message 4.

Scheme 3: The information/channel can be transmitted over a plurality of narrow bands by means of frequency hopping. A plurality of uplink narrow bands and downlink narrow bands can be configured in a SIB for transmitting the information/channel by means of frequency hopping. For example, the PRB indices corresponding to the uplink and downlink narrow bands can be configured and the transmission by frequency hopping can be performed according to a predeteimined pattern. Alternatively, a frequency hopping offset value can be configured and the information/channel can be transmitted by frequency hopping according to the frequency hopping offset value.

In the following, several schemes for transmitting a paging message will be described.

Scheme 1: A paging message is detected on a downlink anchor carrier.

Scheme 2: A paging message is detected on a downlink narrow band corresponding to a PRACH narrow band at the highest coverage level.

Scheme 3: A UE selects a narrow band from a set of paging narrow bands based on a UE identity for detecting a paging message. For example, assuming there are three paging narrow bands having indices of 0, 1 and 2, respectively, the narrow band on which the UE detects the paging message has an index of $n_{ID}^{cell} \mod 3$, where $n_{ID}^{cell}$ is a cell identity and mod denotes a modulo operation. The set of paging narrow bands can be configured, e.g., in a SIB, or predetermined based on a system bandwidth.

Optionally, when the UE detects the paging message, before receiving the uplink and downlink narrow bands configured by an eNB, it detects a downlink control channel on the narrow band on which the paging message is detected. Alternatively, the UE detects a downlink control channel on the downlink narrow band configured by the eNB for the UE when the UE was in a connected state last time.

Optionally, the eNB transmits to the UE an indication signal, indicating to the UE whether to detect the paging message on the anchor carrier or another narrow band.

Optionally, a subframe on which the UE detects the paging message is determined based on the narrow band on which the paging message is detected. Optionally, if NB-PSS/NB-SSS/NB-PBCH/NB-SIB is transmitted on the anchor carrier and if these subframes and the paging occasions the UE calculates according to conventional solutions overlap, the UE does not detect the paging message on those overlapping subframes. If there is no common message on other narrow bands, the UE can detect the paging message on the paging occasions the UE calculates according to the conventional solutions. Alternatively, on the anchor carrier, if the subframes on which NB-PSS/NB-SSS/NB-PBCH/

NB-SIB is transmitted and the paging occasions the UE calculates according to the conventional solutions overlap, the paging occasions will be postponed in a predetermined manner, e.g., to the next subframe or some subframe in the next radio frame.

Optionally, different parameters are used for calculating available subframes on the anchor carrier and other carriers. The equations for calculation can be the same as the existing solution. In the existing solution, Paging Frames (PFs) and Paging Occasions (POs) can be determined according to the equations below.

Equation for determining PFs: SFN mod T=(T div N)* (UE_ID mod N);

Equation for determining PO: i_s=floor(UE_ID/N) mod Ns;

T: DRX period of the UE;

nB: 4T, 2T, T, T/2, T/4, T/8, T/16, T/32;

N: min(T,nB), where min stands for minimum;

Ns: max(1,nB/T), where max stands for maximum;

UE_ID: IMSI mod 1024, IMSI stands for International Mobile Subscriber Identity.

The parameters in the above equations can be different for the anchor carrier and the other carriers. For example, the T value for the anchor carrier can be larger than that for the other carriers. Alternatively, the nB value can be different.

Optionally, the anchor carrier and the other carriers can have different POs. For example, on the anchor carrier, some of the subframes other than the subframes in which PSS/SSS/PBCH/SIB is transmitted are used as paging subframes. On the other carriers, some of Subframes #0, 4, 5 and 9 are used as paging subframes. Optionally, the subframes for transmitting the SIB can be subframes for transmitting the SIB in the system or predetermined transmission subframes. For example, there can be one SIB subframe every 10 subframes. In practice, there can be one SIB subframe every 20 subframes. However, when calculating the POs, it can be considered that there is one SIB subframe every 10 subframes.

Preferred Embodiment 6

In this embodiment, a method for information transmission is provided.

An anchor carrier can be in a transmission bandwidth, and other carriers can be in the transmission bandwidth, in a guard band, or partly in the transmission bandwidth and partly outside the transmission bandwidth. Alternatively, the anchor carrier can be in the guard band, and the other carriers can be in the guard band, in the guard band, or partly in the transmission bandwidth and partly outside the transmission bandwidth.

There can be one or more anchor carriers.

Each coverage level for each channel corresponds to a narrow band, which can be configured by an eNB or predetermined.

Optionally, when there are more than one anchor carrier and more than one available narrow band in the system, one anchor carrier can correspond to a number of available narrow bands. The available narrow bands corresponding to different anchor carriers can be the same, partly the same or completely different.

Optionally, the eNB can signal in a MIB or SIB which narrow bands are the anchor carriers and which are available narrow bands.

Preferred Embodiment 7

In this embodiment, an example in which a system bandwidth, a position of an anchor carrier, an operation mode and a raster offset are jointly coded. Here, the position of the anchor carrier includes the position of the anchor carrier in the in-band mode and the position of the anchor carrier in the guard band mode. In the in-band mode, the position of the anchor carrier can be PRBs within a system bandwidth. In the guard band mode, the position of the anchor carrier can be some narrow bands in a guard band.

Optionally, the operation mode can be a mode corresponding to the anchor carrier. For example, in the in-band mode, the anchor carrier can be in a PRB in a transmission bandwidth within the system bandwidth. In the guard band mode, the anchor carrier can be in the guard band in the system bandwidth. In the standalone mode, the anchor carrier is in a non-LTE carrier. Here, it is possible that, when there is a plurality of carriers, the anchor carrier and other carriers may have different modes.

It is assumed that the candidate positions for the anchor carrier in the guard band mode are shown in Table 3.

TABLE 3

| | System Bandwidth | | | |
|---|---|---|---|---|
| | 5 MHz | 10 MHz | 15 MHz | 20 MHz |
| Center Frequency of Carrier | ±2392.5 | ±4597.5/ 702.5/ 4807.5/ 4897.5 | ±6892.5/6997.5/ 7102.5/7207.5/ 7297.5/7402.5 | ±9097.5/9202.5/ 9307.5/9397.5/ 9502.5/9607.5/ 9697.5/9802.5/ 9907.5 |
| Raster Offset | ±7.5 | ±2.5/m2.5/ m7.5/±2.5 | ±7.5/±2.5/ m2.5/m7.5/ ±2.5/±7.5 | ±2.5/m2.5/ m7.5/±2.5/ m2.5/m7.5/±2.5/ m2.5/m7.5 |

In Table 3, the symbol of "±" in the values of "Center Frequency of Carrier" applies to all frequencies in the cell. There are in total 40 candidate positions. Here, each the values of "Center Frequency of Carrier" is a raster offset of a center frequency of the anchor carrier in the NB-IoT system from the DC of the system bandwidth, in kHz. The "Raster Offset" in Table 3 relates to a raster offset from the closest integer multiple of 100 kHz. For example, for a system bandwidth of 5 MHz, the center frequency is +2392.5 and has to be added with +7,5 kHz to reach +2400 kHz.

Some of the carriers indicated in Table 1 overlap. There are up to 22 non-overlapping candidate positions. Table 4 shows an example of a non-overlapping candidate position.

TABLE 4

| | System Bandwidth | | | |
|---|---|---|---|---|
| | 5 MHz | 10 MHz | 15 MHz | 20 MHz |
| Center Frequency of Carrier | ±2392.5 | ±4597.5/ 4807.5 | ±6892.5/ 7102.5/ 7297.5 | ±9097.5/9307.5/ 9502.5/9697.5/ 9907.5 |
| Raster Offset | ±7.5 | ±2.5/m7.5 | ±7.5/ m2.5/±2.5 | ±2.5/m7.5/ m2.5/±2.5/ m7.5 |

Table 5 shows an example of the jointly coded system bandwidths, positions of anchor carriers (including the positions of the anchor carriers in the in-band mode and the guard band mode) and operation modes. Here, there are 16 candidate positions for the guard band mode. In practice, the number of candidate positions and the candidate positions are not limited to those shown in Table 5. For the guard band mode, some positions can be selected from the set shown in Table 3.

TABLE 5

| 值 | Operation Mode | System Bandwidth | Position of NB-IoT Carrier | Raster Offset |
|---|---|---|---|---|
| 0 | In-band | 3 MHz | 2 | +7.5 kHz |
| 1 | In-band | 3 MHz | 12 | −7.5 kHz |
| 2 | In-band | 5 MHz | 2 | +7.5 kHz |
| 3 | In-band | 5 MHz | 7 | +7.5 kHz |
| 4 | In-band | 5 MHz | 17 | −7.5 kHz |
| 5 | In-band | 5 MHz | 22 | −7.5 kHz |
| 6 | In-band | 15 MHz | 2 | +7.5 kHz |
| 7 | In-band | 15 MHz | 7 | +7.5 kHz |
| 8 | In-band | 15 MHz | 12 | +7.5 kHz |
| 9 | In-band | 15 MHz | 17 | +7.5 kHz |
| 10 | In-band | 15 MHz | 22 | +7.5 kHz |
| 11 | In-band | 15 MHz | 27 | +7.5 kHz |
| 12 | In-band | 15 MHz | 32 | +7.5 kHz |
| 13 | In-band | 15 MHz | 42 | −7.5 kHz |
| 14 | In-band | 15 MHz | 47 | −7.5 kHz |
| 15 | In-band | 15 MHz | 52 | −7.5 kHz |
| 16 | In-band | 15 MHz | 57 | −7.5 kHz |
| 17 | In-band | 15 MHz | 62 | −7.5 kHz |
| 18 | In-band | 15 MHz | 67 | −7.5 kHz |
| 19 | In-band | 15 MHz | 72 | −7.5 kHz |
| 20 | In-band | 10 MHz | 4 | −2.5 kHz |
| 21 | In-band | 10 MHz | 9 | −2.5 kHz |
| 22 | In-band | 10 MHz | 14 | −2.5 kHz |
| 23 | In-band | 10 MHz | 19 | −2.5 kHz |
| 24 | In-band | 10 MHz | 30 | +2.5 kHz |
| 25 | In-band | 10 MHz | 35 | +2.5 kHz |
| 26 | In-band | 10 MHz | 40 | +2.5 kHz |
| 27 | In-band | 10 MHz | 45 | +2.5 kHz |
| 28 | In-band | 20 MHz | 4 | −2.5 kHz |
| 29 | In-band | 20 MHz | 9 | −2.5 kHz |
| 30 | In-band | 20 MHz | 14 | −2.5 kHz |
| 31 | In-band | 20 MHz | 19 | −2.5 kHz |
| 32 | In-band | 20 MHz | 24 | −2.5 kHz |
| 33 | In-band | 20 MHz | 29 | −2.5 kHz |
| 34 | In-band | 20 MHz | 34 | −2.5 kHz |
| 35 | In-band | 20 MHz | 39 | −2.5 kHz |
| 36 | In-band | 20 MHz | 44 | −2.5 kHz |
| 37 | In-band | 20 MHz | 55 | +2.5 kHz |
| 38 | In-band | 20 MHz | 60 | +2.5 kHz |
| 39 | In-band | 20 MHz | 65 | +2.5 kHz |
| 40 | In-band | 20 MHz | 70 | +2.5 kHz |
| 41 | In-band | 20 MHz | 75 | +2.5 kHz |
| 42 | In-band | 20 MHz | 80 | +2.5 kHz |
| 43 | In-band | 20 MHz | 85 | +2.5 kHz |
| 44 | In-band | 20 MHz | 90 | +2.5 kHz |
| 45 | In-band | 20 MHz | 95 | +2.5 kHz |
| 46 | Guard band | 5 MHz | +2392.5 | +7.5 kHz |
| 47 | Guard band | 5 MHz | −2392.5 | −7.5 kHz |
| 48 | Guard band | 10 MHz | +4597.5 | +2.5 kHz |
| 49 | Guard band | 10 MHz | −4597.5 | −2.5 kHz |
| 50 | Guard band | 10 MHz | +4807.5 | −7.5 kHz |
| 51 | Guard band | 10 MHz | −4807.5 | +7.5 kHz |
| 52 | Guard band | 15 MHz | +6892.5 | +7.5 kHz |
| 53 | Guard band | 15 MHz | −6892.5 | −7.5 kHz |
| 54 | Guard band | 15 MHz | +7102.5 | −2.5 kHz |
| 55 | Guard band | 15 MHz | −7102.5 | +2.5 kHz |
| 56 | Guard band | 20 MHz | +9097.5 | +2.5 kHz |
| 57 | Guard band | 20 MHz | −9097.5 | −2.5 kHz |
| 58 | Guard band | 20 MHz | +9307.5 | −7.5 kHz |
| 59 | Guard band | 20 MHz | −9097.5 | +7.5 kHz |
| 60 | Guard band | 20 MHz | +9502.5 | −2.5 kHz |
| 61 | Guard band | 20 MHz | −9097.5 | +2.5 kHz |
| 62 | Standalone | / | / | / |
| 63 | Reserved | | | |

Alternatively, for the guard band mode, instead of indicating the position of the center frequency, the raster offset can be indicated, as shown in Table 6 below, using 6 bits.

TABLE 6

| 值 | Corresponding State |
|---|---|
| 0~45 | Positions, PRB indices and/or raster offsets in the in-band mode, as shown in Table 5 |
| 46 | Raster offset of +7.5 kHz in the guard band mode |
| 47 | Raster offset of −7.5 kHz in the guard band mode |
| 48 | Raster offset of +2.5 kHz in the guard band mode |
| 49 | Raster offset of −2.5 kHz in the guard band mode |
| 50 | Standalone mode |
| 51~63 | Reserved |

Optionally, same—Physical Cell Identity (PCI), which indicates whether the PCI of NB-IoT is the same as the PCI of the system bandwidth in the in-band or guard band mode, can be indicated using 1 bit.

In practice, the present disclosure is not limited to the above examples.

Preferred Embodiment 8

In this embodiment, an example in which a system bandwidth, a position of an anchor carrier (including the position of the anchor carrier in the in-band mode and the position of the anchor carrier in the guard band mode), an operation mode and a raster offset are jointly coded, as shown in Table 7.

TABLE 7

| 值 | Corresponding State |
|---|---|
| 0~45 | Positions, PRB indices and/or raster offsets in the in-band mode, as shown in Table 5 |
| 46~63 | Positions and/or raster offsets in the guard band mode |

Here, the positions in the guard band mode can be the specific positions shown in Table 5 or the raster offset values shown in Table 6. In the latter case, there are spare states for indicating other information.

The operation mode can be indicated, using 1 bit, as standalone or non-standalone. The same-PCI information can be indicated, using 1 bit, as the same PCI or different PCIs. Here, the same-PCI information can be indicated for the in-band mode, or both the in-band mode and the guard band mode. Alternatively, they can be jointly coded and indicated, as shown in Table 8.

TABLE 8

| 值 | Operation Mode | Same-PCI Information |
|---|---|---|
| 0 | Standalone | / |
| 1 | In-band/guard band | Same PCI |
| 2 | In-band/guard band | Different PCIs |
| 3 | Reserved | |

In the standalone mode, the remaining states can be used to indicate some parameters in the standalone mode.

Preferred Embodiment 9

In this embodiment, an example of joint indication is provided.

An operation mode and same-PCI information in the in-band mode can be jointly indicated, as shown in Table 9.

TABLE 9

| Value | Operation Mode | Same-PCI Information |
|---|---|---|
| 0 | Stand alone | |
| 1 | Guard band | |
| 2 | In-band | Same PCI |
| 3 | In-band | Different PCIs |

A system bandwidth, a position of an anchor carrier, a raster offset and the same-PCI information in the guard band mode can be jointly indicated using 6 bits, as shown in Table 10. The 6-bit information can be interpreted according to the operation mode as indicated in Table 9, i.e., whether it is a PRB index in the in-band mode or the position and same-PCI information in the guard band mode. In the in-band mode, it can be interpreted as the second column in Table 10; whereas in the guard band mode, it can be interpreted as the third column in Table 10.

TABLE 10

| Value | States in in-band mode | States in guard band mode |
|---|---|---|
| 0~21 | Positions, PRB indices and/or raster offsets in the in-band mode | Positions and/or raster offsets (22 different types) in the guard band mode, with same PCI |
| 22~43 | Positions, PRB indices and/or raster offsets in the in-band mode | Positions and/or raster offsets (22 different types) in the guard band mode, with different PCIs |
| 44~45 | Positions, PRB indices and/or raster offsets in the in-band mode | Reserved |
| 46~63 | Reserved | Reserved |

In practice, the present disclosure is not limited to the above examples.

Preferred Embodiment 10

An operation mode can be indicated separately or jointly with same-PCI. In an example, the operation mode and the same-PCI information can be jointly indicated, assuming only the in-band mode has the same-PCI information, as shown in Table 11.

TABLE 11

| Value | Operation Mode | Same-PCI Indication in In-band Mode |
|---|---|---|
| 0 | Standalone | / |
| 1 | Guard band | / |
| 2 | In-band | Same PCI |
| 3 | In-band | Different PCIs |

Assuming both the in-band mode and the guard band mode have the same-PCI information, an example is shown in Table 12.

TABLE 12

| Value | Operation Mode | Same-PCI Indication in In-band/Guard band Mode |
|---|---|---|
| 0 | Stand alone | / |
| 1 | Guard band | Same PCI |
| 2 | Guard band | Different PCIs |
| 3 | In-band | Same PCI |
| 4 | In-band | Different PCIs |
| 5~7 | Reserved | |

The 6-bit information can be interpreted according to the operation mode as indicated in Table 12, i.e., whether it is a PRB index in the in-band mode or the position and same-PCI information in the guard band mode. In the in-band mode, it can be interpreted as the second column in Table 13; whereas in the guard band mode, it can be interpreted as the third column in Table 13.

TABLE 13

| Value | States in in-band mode | States in guard band mode |
|---|---|---|
| 0~21 | Positions, PRB indices and/or raster offsets in the in-band mode | Positions and/or raster offsets (22 different types) in the guard band mode |
| 22~45 | Positions, PRB indices and/or raster offsets in the in-band mode | Reserved |
| 46~63 | Reserved | Reserved |

In practice, the present disclosure is not limited to the above examples.

Preferred Embodiment 11

One bit is used to indicate whether there are 4 legacy CRS ports or less. For less than 4 ports, the legacy CRS ports are the same as NB-CRS ports, which are CRSs for the NB-IoT system. An example is shown in Table 14.

TABLE 14

| Value | No. of Legacy CRS Ports |
|---|---|
| 0 | 4 |
| 1 | 1 when the number of NB-CRS port is 1, or 2 when the number of NB-CRS ports is 2. |

Any two or three of the legacy CRS port, operation mode and same-PCI information can be jointly coded. Examples are shown in Table 15 or 16.

TABLE 15

| Value | Operation Mode | Same-PCI Information |
|---|---|---|
| 0 | Standalone | / |
| 1 | In-band | Same PCI |
| 2 | In-band | Different PCIs |
| 3 | guard band | Same PCI |
| 4 | guard band | Different PCIs |
| 5~7 | Reserved | |

TABLE 16

| Value | Operation Mode | Same-PCI Information | Legacy CRS Port Information |
|---|---|---|---|
| 0 | Standalone | / | / |
| 1 | In-band | Same PCI | 4 |
| 2 | In-band | Different PCIs | 4 |
| 3 | In-band | Same PCI | 1 or 2 |
| 4 | In-band | Different PCIs | 1 or 2 |
| 5 | guard band | Same PCI | / |
| 6 | guard band | Different PCIs | / |
| 7 | | Reserved | |

In practice, the present disclosure is not limited to the above examples.

With the description of the above embodiments, it will be apparent to those skilled in the art that the method according to the above embodiments can be realized by means of software plus the necessary general hardware platform, and of course can be implemented via hardware, but in many cases the former is the better implementation. Based on this understanding, the technical solution of the present invention, in essence or in terms of parts contributing to the prior art, can be embodied in the form of a software product, which is stored in a storage medium (e.g., ROM/RAM, disc, CD-ROM) and includes a number of instructions for enabling a terminal device (which may be a mobile phone, a computer, a server, or a network device, etc.) to perform the method described in the various embodiments of the present invention.

Embodiments of the present invention also provide a storage medium. Alternatively, in the present embodiment, the above-described storage medium may be configured to store program code for performing the following steps:

At step S1, available narrow bands are determined based on information comprising at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Infoimation Block (SIB). Information or channel transmitted over the narrow bands comprises at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUCCH).

At step S2, the information or channel is transmitted over one or more of available narrow bands. The available narrow bands include available uplink narrow bands and/or available downlink narrow bands.

Optionally, the storage medium is further configured to store program code for performing the method steps of the above-described embodiments.

Alternatively, in the present embodiment, the above-described storage medium may include, but not limited to, a USB disk, a Read-Only Memory (ROM), a Random Access Memory (RAM), a mobile hard disk, a magnetic Disc or CD-ROM and other media that can store program code.

Optionally, in the present embodiment, the processor executes the method steps of the above embodiments in accordance with the program code stored in the storage medium.

Optionally, for specific examples in the present embodiment, reference can be made to the examples described in connection with the above embodiments and optional embodiments, and details thereof will be omitted here.

It will be apparent to those skilled in the art that the above-described modules or steps of the present invention may be implemented by means of a general purpose computing device, and may be placed at a single computing device or distributed over a network of multiple computing devices. Optionally, they may be implemented by means of program code executable by the computing device, so that they may be stored in a storage device and executed by a computing device, and in some cases, they may be performed in a different order from the steps shown or described here, or they may be made separately into individual integrated circuit modules, or may be implemented by making multiple modules or steps therein into a single integrated circuit module. Thus, the present invention is not limited to any particular hardware, software, and the combination thereof.

The foregoing is merely illustrative of the preferred embodiments of the present invention and is not intended to limit the present invention. Various changes and modifications may be made by those skilled in the art. Any modifications, equivalent substitutions, improvements, and the like within the spirit and principles of the invention are intended to be included within the scope of the present invention.

INDUSTRIAL APPLICABILITY

The embodiments of the present disclosure can be applied in information transmission. Information or a channel is transmitted over one or more of available narrow bands. The available narrow bands include available uplink narrow bands and/or available downlink narrow bands and the available narrow bands are determined based on information including at least one of: a system bandwidth, a cell identity, a position of an anchor carrier, information indicated by a Primary Synchronization Signal (PSS), information indicated by a Secondary Synchronization Signal (SSS), information indicated by a Master Information Block (MIB) and information indicated by a System Information Block (SIB). The information or channel transmitted over the one or more narrow bands includes at least one of: a downlink control channel, a Physical Downlink Shared Channel (PDSCH), a Random Access Response (RAR), a paging message, a SIB, a MIB, a Physical Random Access Channel (PRACH), a Physical Uplink Shared Channel (PUSCH), and a Physical Uplink Control Channel (PUSCH). It is possible to solve the problem regarding how to obtain multiple narrow bands/carriers in NB-IoT and provide a scheme for determining available narrow bands.

What is claimed is:

1. A method performed by a wireless communication device, comprising:
receiving a message from a wireless communication node, the message comprising information of a frequency position of an anchor carrier that is configured to carry a synchronization signal, an indication of an operation mode assigned to the wireless communication device and an indicator of same-Physical Cell Identity (PCI), wherein the operation mode indication indicates inband deployment, and wherein the indicator of same-PCI indicates the physical identity of the cell where the wireless communication device is located is the same as the physical identity of a cell corresponding to a wireless system of the inband deployment; and
determining, based on the message, the operation mode and the frequency position of the anchor carrier, wherein the frequency position of the anchor carrier, the operation mode and the indicator of same-PCI are jointly coded and indicated.

2. The method of claim 1, wherein the frequency position of the anchor carrier is indicated by a Physical Resource Block index that corresponds to an offset from a center frequency.

3. The method of claim 1, wherein the synchronization signal comprises at least one of a Narrow Band Primary Synchronization Signal (NB-PSS) or a Narrow Band Secondary Synchronization Signal (NB-SSS).

4. A method performed by a wireless communication node, comprising:
   transmitting a message to a wireless communication device, the message comprising information of a frequency position of an anchor carrier that is configured to carry a synchronization signal, an indication of an operation mode assigned to the wireless communication device and an indicator of same-Physical Cell Identity (PCI),
   wherein the operation mode indication indicates inband deployment,
   wherein the indicator of same-PCI indicates the physical identity of the cell where the wireless communication device is located is the same as the physical identity of a cell corresponding to a wireless system of the inband deployment, and
   wherein the frequency position of the anchor carrier, the operation mode and the indicator of same-PCI are jointly coded and indicated.

5. The method of claim 4, wherein the frequency position of the anchor carrier is indicated by a Physical Resource Block index that corresponds to an offset from a center frequency.

6. A wireless communication device, comprising:
   a receiver configured to receive a message from a wireless communication node, the message comprising information of a frequency position of an anchor carrier that is configured to carry a synchronization signal, an indication of an operation mode assigned to the wireless communication device and an indicator of same-Physical Cell Identity (PCI), wherein the indication of the operation mode indicates inband deployment, and wherein the indicator of same-PCI indicates the physical identity of the cell where the wireless communication device is located is the same as the physical identity of a cell corresponding to a wireless system of the inband deployment; and
   at least one processor configured to determine the operation mode based on the message,
   wherein the frequency position of the anchor carrier, the operation mode and the indicator of same-PCI are jointly coded and indicated.

7. The wireless communication device of claim 6, wherein the at least one processor is further configured to determine the frequency position of the anchor carrier based on a Physical Resource Block index that corresponds to an offset from a center frequency.

8. A wireless communication node, comprising:
   a transmitter configured to transmit a message to a wireless communication device, the message comprising information of a frequency position of an anchor carrier that is configured to carry a synchronization signal, an indication of an operation mode assigned to the wireless communication device and an indicator of same-Physical Cell Identity (PCI);
   wherein the operation mode indication indicates inband deployment;
   wherein the indicator of same-PCI indicates the physical identity of the cell where the wireless communication device is located is the same as the physical identity of a cell corresponding to a wireless system of the inband deployment; and
   wherein the frequency position of the anchor carrier, the operation mode and the indicator of same-PCI are jointly indicated by the operation mode indication.

9. The wireless communication node of claim 8, wherein the frequency position of the anchor carrier is indicated by a Physical Resource Block index that corresponds to an offset from a center frequency.

* * * * *